(12) United States Patent
Karpman

(10) Patent No.: US 10,473,146 B2
(45) Date of Patent: Nov. 12, 2019

(54) BALL SOCKET ASSEMBLY

(71) Applicant: FEDERAL-MOGUL MOTORPARTS LLC, Southfield, MI (US)

(72) Inventor: Alexander Karpman, Ballwin, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 78 days.

(21) Appl. No.: 15/706,912

(22) Filed: Sep. 18, 2017

(65) Prior Publication Data

US 2018/0003216 A1 Jan. 4, 2018

Related U.S. Application Data

(62) Division of application No. 14/581,130, filed on Dec. 23, 2014, now Pat. No. 9,765,811.

(51) Int. Cl.
*F16C 11/06* (2006.01)
*B23P 15/00* (2006.01)

(52) U.S. Cl.
CPC ........ *F16C 11/0609* (2013.01); *B23P 15/003* (2013.01); *F16C 11/0685* (2013.01); *B23P 2700/11* (2013.01); *F16C 11/0628* (2013.01); *F16C 11/0642* (2013.01); *F16C 2226/52* (2013.01); *F16C 2226/72* (2013.01); *F16C 2326/24* (2013.01); *Y10T 403/32762* (2015.01)

(58) Field of Classification Search
CPC . B23P 15/003; B23P 2700/11; F16C 11/0609; F16C 11/0685; F16C 11/0642; F16C 11/0628; F16C 2326/24; F16C 2226/52; F16C 2226/72; Y10T 403/32762
See application file for complete search history.

(56) References Cited

U.S. PATENT DOCUMENTS

2007/0163100 A1* 7/2007 Schmidt ................ B23P 11/005
29/441.1
2014/0294486 A1* 10/2014 Staade ................ F16C 11/0671
403/113

FOREIGN PATENT DOCUMENTS

DE 4419954 A1 * 1/1996 ............... B62D 7/16

OTHER PUBLICATIONS

Machine Translation for Zivkovic, DE 4419954 A1 (Year: 1996).*

* cited by examiner

*Primary Examiner* — David P Bryant
*Assistant Examiner* — Christine Pellazar Bersabal
(74) *Attorney, Agent, or Firm* — Robert L. Stearns; Dickinson Wright, PLLC

(57) ABSTRACT

The ball socket assembly includes a housing with an open interior which extends along an axis. A bearing is disposed in the open interior of the housing and has a curved primary contact surface which surrounds the axis and surrounds a stud ball opening. A stud ball is disposed in the opening and is in sliding contact with the primary contact surface for allowing rotation of the stud ball relative to the bearing. The stud ball has an equator and is in sliding contact with the bearing on both sides of the equator. A stud is operably connected with the stud ball. A shoe is further provided and has a pair of supplemental contact surfaces that are biased against the stud ball. The shoe provides the stud with a predetermined rotational torque and also adjusts for wear in the assembly to maintain the performance of the socket assembly.

10 Claims, 5 Drawing Sheets

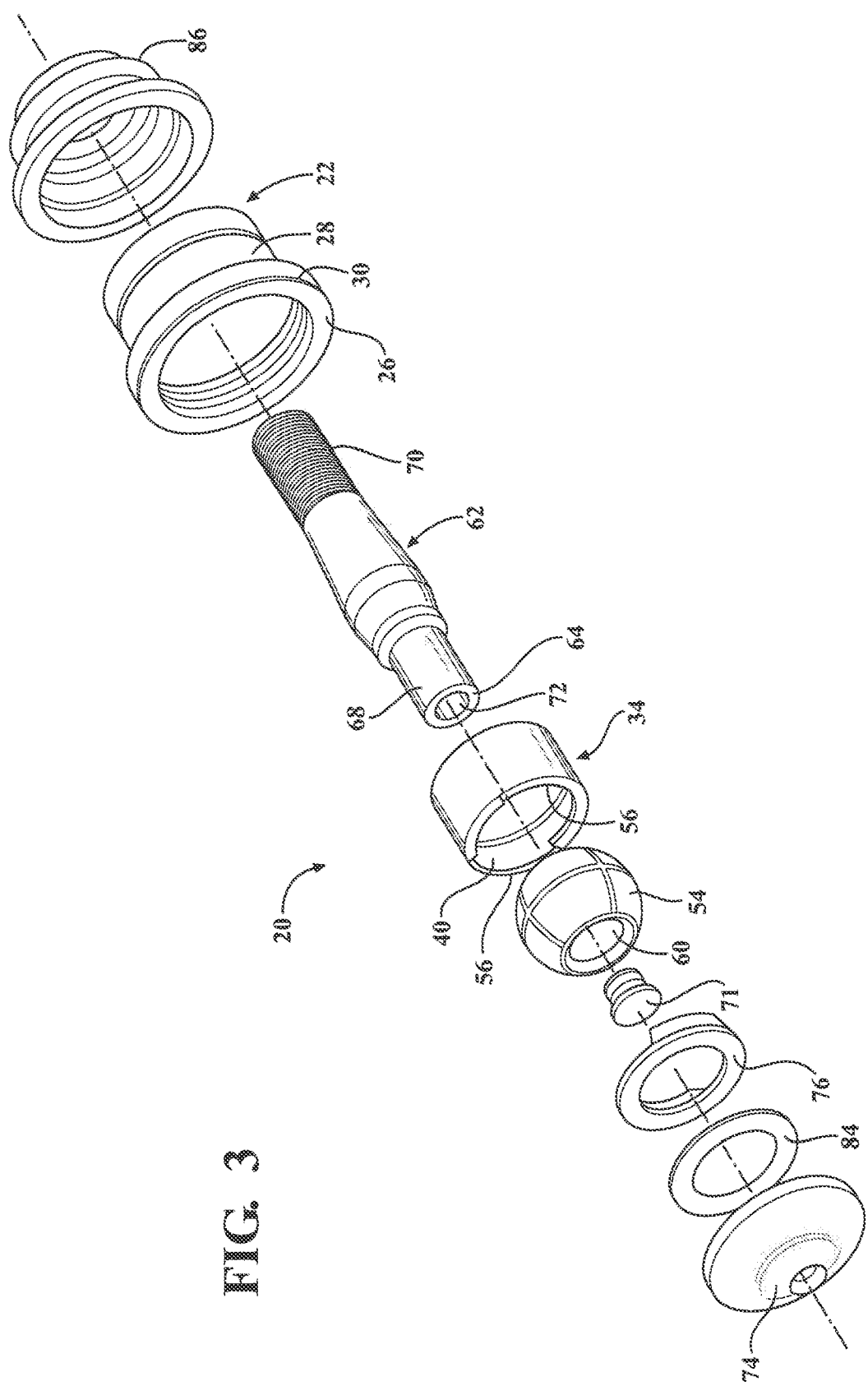

BALL SOCKET ASSEMBLY

CROSS REFERENCE TO RELATED APPLICATION

This U.S. Divisional application claims priority to U.S. Utility application Ser. No. 14/581,130, filed Dec. 23, 2014, and is incorporated herein by reference.

BACKGROUND OF THE INVENTION

1. Field of the Invention

The present invention is related generally to a socket joint of the type used in vehicular steering and suspension applications.

2. Related Art

Vehicle steering and suspension systems typically include one or more ball joints, or socket assemblies, such as tie rod end ball-type joints for operable attachment of a tie rod end to a steering knuckle.

Typical ball joint assemblies include an outer housing piece with an open interior and a one-piece stud. The stud has a shank portion and a ball portion which are integrally connected with one another. The ball portion is generally spherical in shape and is captured within an open interior by a pair of bearings with the shank portion projecting out of the open interior. Each of the bearings has a curved contact surface for allowing rotation or pivoting of the stud relative to the housing and to the bearing. Such ball joint assemblies typically also include a cover plate which closes an end of the open interior of the housing.

There remains a continuing need for an improved ball joint assembly which offers similar or improved performance but is less costly to produce.

SUMMARY OF THE INVENTION

One aspect of the present invention provides for an improved low-cost ball socket assembly. The ball socket assembly includes a housing which extends along an axis between opposing first and second ends. The housing has an open interior which opens at one or both of the ends. The assembly additionally includes a bearing which is disposed in the open interior of the housing and has a curved primary contact surface which surrounds the axis and surrounds a stud ball opening. A stud ball is disposed in the opening and is in sliding contact with the primary contact surface of the bearing for allowing rotation of the stud ball relative to the bearing. The stud ball has an equator which is in sliding contact with the bearing on both sides of the equator. A stud, which is formed as a separate piece from the stud ball, is operably connected with the stud ball. A shoe which has at least one curved supplemental contact surface is further provided, and the supplemental contact surface is biased against the stud ball. The shoe provides the stud ball and the stud with a predetermined rotational torque and also adjusts for wear in the bearing and the stud ball to maintain the performance of the socket assembly.

Another aspect of the present invention provides for a method of making a ball socket assembly. The method includes the step of preparing a housing with an open interior. The method continues with the step of inserting a bearing into the open interior of the housing. The bearing has a primary contact surface which is curved and which surrounds a stud ball opening. The bearing also has a passage with a predetermined shape which extends to the stud ball opening. The method proceeds with the step of orienting a stud ball which has a curved outer surface into a predetermined orientation. The method continues with the step of guiding the stud ball into stud ball opening of the bearing through the passage. The method proceeds with the step of rotating the stud ball relative to the bearing within the stud ball opening to establish sliding contact between the curved outer surface of the stud ball and the primary contact surface of the bearing. The method continues with the step of inserting a shoe into the open interior of the housing, the shoe has at least one supplemental contact surface which extends into the passage of the bearing to establish sliding contact between the supplemental contact surface of the shoe and the curved outer surface of the stud ball. The method proceeds with the step of biasing the at least one supplemental contact surface of the shoe against the curved outer surface of the stud ball for establishing a preload on the stud ball and for compensating for wear in the bearing and the stud ball.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is an exploded view of the ball socket assembly of FIG. 1;

DESCRIPTION OF THE ENABLING EMBODIMENT

Figure 2:
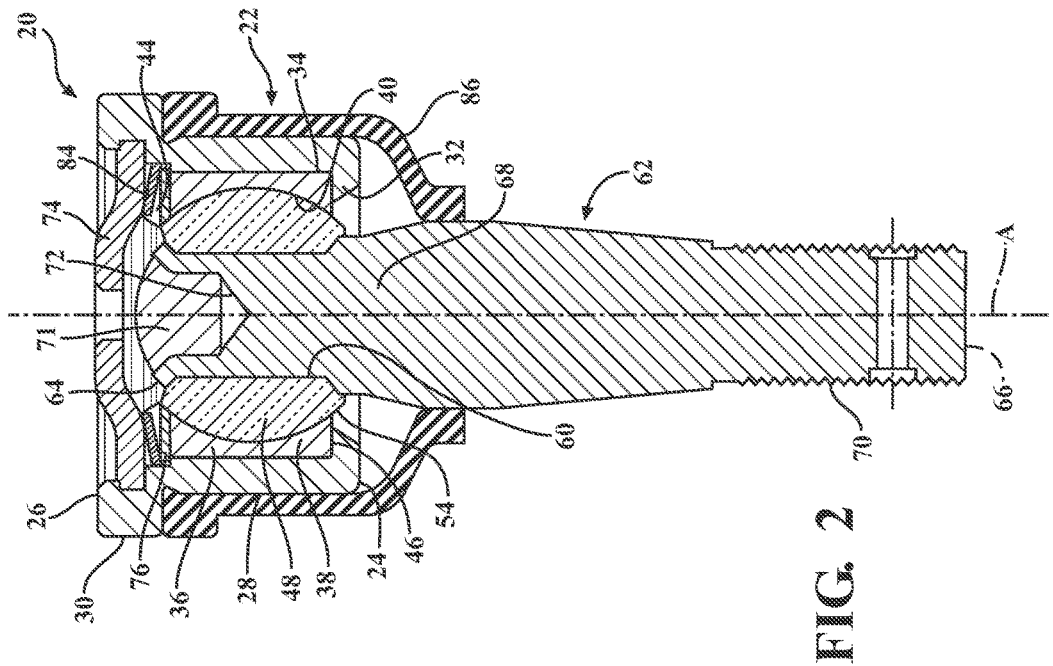
FIG. 2 is a cross-sectional view of the ball socket assembly of FIG. 1 and taken from a different plane from the view of FIG. 1.
Figure 1:
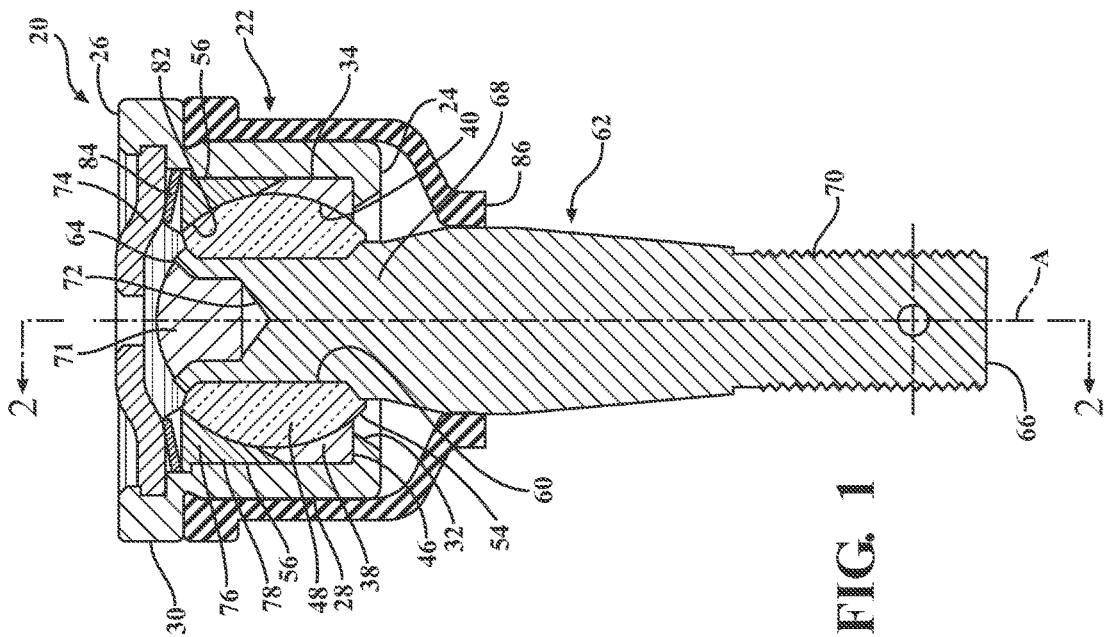
FIG. 1 is a cross-sectional view of an exemplary embodiment of a ball socket assembly.

Referring to the Figures, wherein like numerals indicate corresponding parts throughout the several views, an exemplary embodiment of an improved ball socket joint assembly 20 is generally shown in FIGS. 1 and 2. The socket assembly 20 may find uses in, for example, a suspension or steering system of an automobile or in any suitable automotive or non-automotive application.

The exemplary embodiment of the socket assembly 20 includes a housing 22 with an open interior that extends along an axis A from an open first housing end 24 to an open second housing end 26. The housing 22 is generally cylindrical in shape and has an exterior surface 28 which is shaped and sized to be pressed into an opening of another part (not shown), such as a component of a vehicle suspension system or a vehicle steering system. The housing 22 has a radially outwardly extending flange 30 adjacent the second housing end 26 for defining a stopping point for the insertion of the housing 22 into the opening of the other part, e.g., the vehicle suspension or steering part. The housing 22 further includes a lip 32 which extends radially inwardly into the open interior adjacent the first housing end 24. The housing 22 is preferably made as one integral piece of a metal, such as steel.

Figure 4:
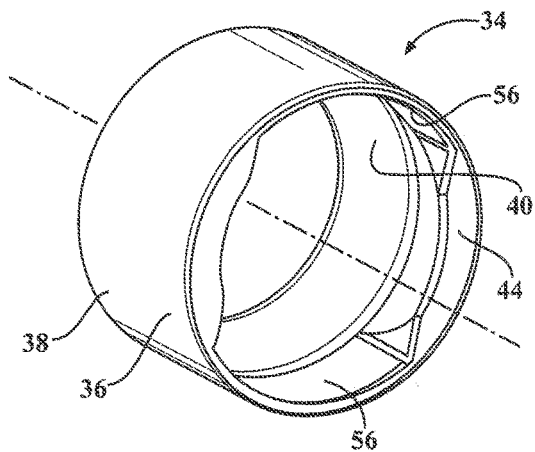
FIG. 4 is a perspective view of a bearing in the ball socket assembly of FIG. 1.
Figure 5:
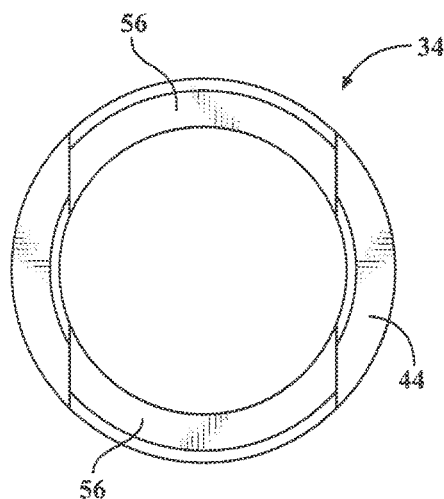
FIG. 5 is a top elevation view of the bearing of FIG. 4.

A bearing 34, which is formed as a separate piece from the housing 22, is disposed in the open interior of the housing 22 and extends along the axis A between upper and lower portions 36, 38. As shown in FIGS. 4 and 5, the bearing 34 has an interior wall which presents a primary contact surface 40 that surrounds a stud ball opening. The primary contact surface 40 is semi-spherically curved with a generally constant diameter. The upper portion 36 of the bearing 34 has an upper face 44, and the lower portion 38 has a lower face 46. As shown in FIG. 2, in the exemplary embodiment, the upper face 44 of the bearing 34 abuts the lip 32 in the housing 22 to define a stopping point for the insertion of the bearing 34 into the open interior of the housing 22. The primary contact surface 40 extends into both of the upper and lower portions 36, 38 such that the stud ball opening is partially located in the upper portion 36 and partially located in the lower portion 38 of the bearing 34.

Figure 6:
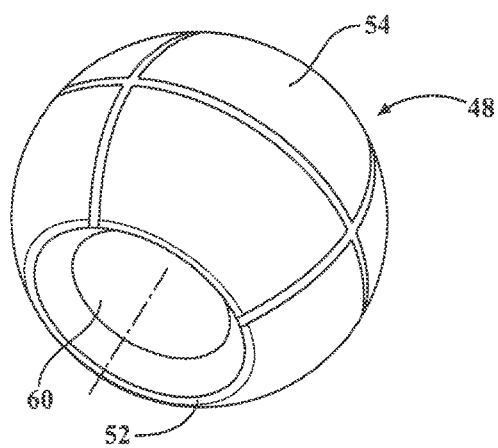
FIG. 6 is a perspective view of a stud ball of the ball socket assembly of FIG. 1.
Figure 7:
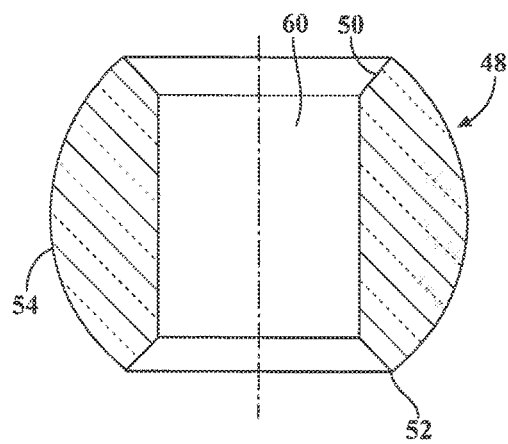
FIG. 7 is a cross-section view of the stud ball of FIG. 6.

Referring back to FIG. 1, the socket assembly 20 further includes a stud ball 48 which is disposed in the stud ball opening of the bearing 34. As shown in FIGS. 6 and 7, the stud ball 48 is generally spherical in shape but with a truncated top 50 and a truncated bottom 52. The stud ball 48 has an equator which is located approximately halfway between the truncated top 50 and the truncated bottom 52 and a semi-spherically curved outer surface 54 which extends 360 degrees around the stud ball 48. As shown in FIG. 1, the curved outer surface 54 has a diameter that is similar to the diameter of the curvature of the primary contact surface 40 of the bearing 34 and is in sliding contact with the primary contact surface 40 of the bearing 34 to allow the stud ball 48 to rotate within the stud ball opening relative to the bearing 34 and the housing 22. A lubricant (not shown), such as grease, is preferably employed to provide a low-friction interface between the stud ball 48 and the housing 22. The stud ball 48 is preferably made of one integral piece of metal, such as steel.

Referring now to FIGS. 1, 4 and 5, the upper portion 36 of the bearing 34 includes a passage 56 which is shaped for guiding the stud ball 48 into the stud ball opening 42 during assembly. Specifically, the passage 56 extends from the upper face 44 of the bearing 34 to the stud ball opening 42. In the exemplary embodiment, the passage 56 is defined by a pair of diametrically opposed slots 56 which extend radially from a circular opening to provide the passage 56 with a shape that approximates an oval with a pair of long sides and a pair of curved sides.

Figure 11:
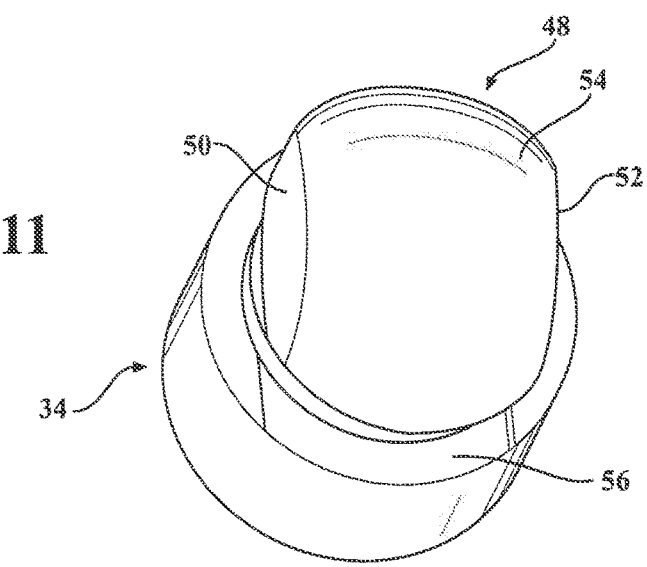
FIG. 11 is a perspective view showing the stud ball in a pre-installed state adjacent the bearing.
Figure 12:
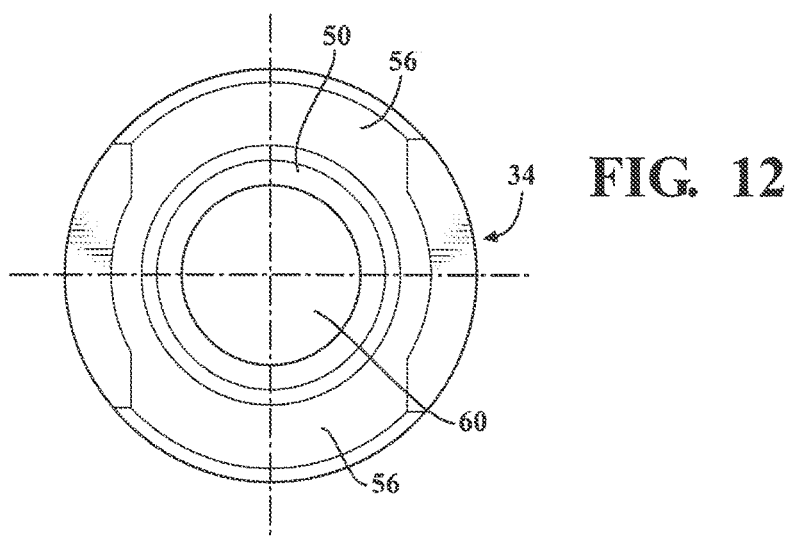
FIG. 12 is a top view of the stud ball installed within the bearing.

Referring now to FIGS. 11 and 12, insertion of the stud ball 48 into the stud ball opening 42 of the bearing 34 through the passage 56 is very quick and requires no special tools. The process simply involves aligning the truncated top 50 and the truncated bottom 52 of the stud ball 48 with the long sides of the passage 56 on the upper face 44 of the bearing 34 and feeding or guiding the stud ball 48 through the opening. Next, the stud ball 48 rotated by 90 degrees to the orientation shown in FIG. 1, thereby trapping the stud ball 48 in the stud ball opening 42 of the bearing 34.

Figure 8:
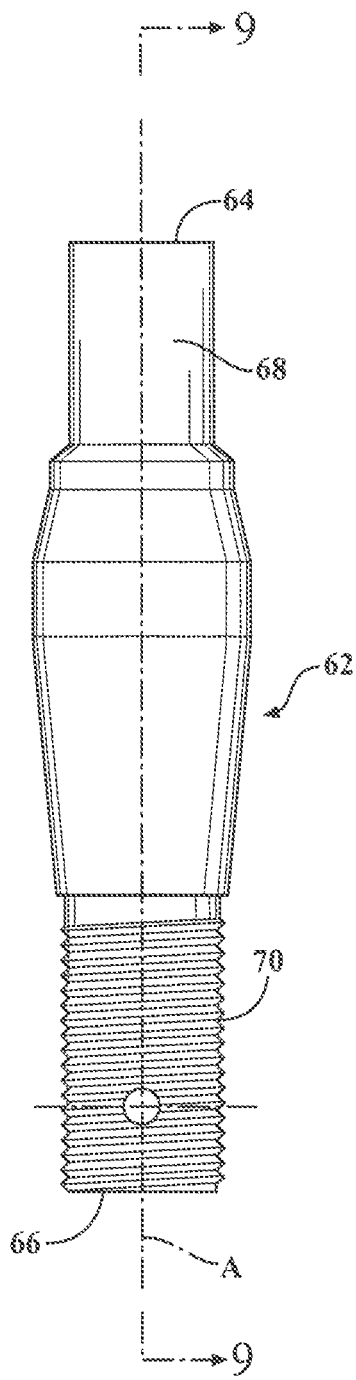
FIG. 8 is a front elevation view of a stud of the ball socket assembly of FIG. 1.
Figure 9:
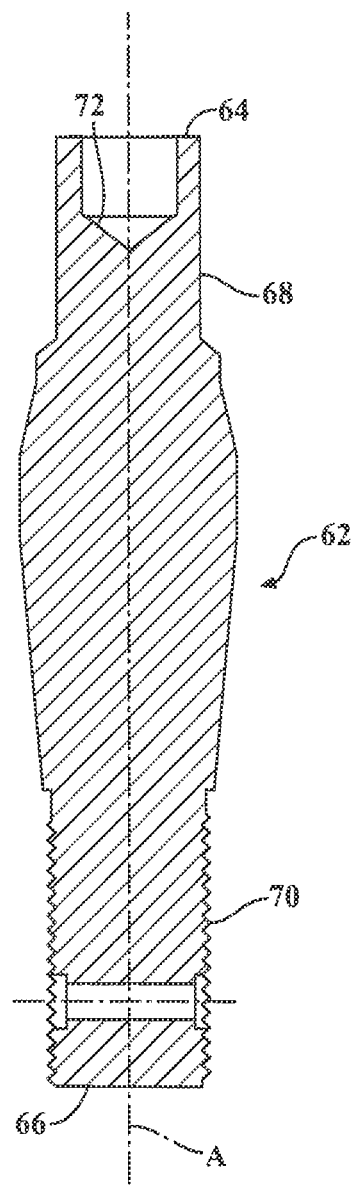
FIG. 9 is a cross-sectional view of the stud taken along Line 9-9 of FIG. 8.

Referring to FIGS. 1, 2, 6 and 7, the stud ball 48 has an inner bore 60 which extends axially between the truncated top 50 and the truncated bottom 52, and a stud 62, which is formed as a separate piece from the stud ball 48, extends through the inner bore 60. As shown in FIGS. 8 and 9, the exemplary stud 62 extends along the axis A from a first stud end 64 to a second stud end 66 and has a cylindrical portion 68 adjacent the first stud end 64 and a threaded portion 70 adjacent the second stud end 66. The diameter of the cylindrical portion 68 of the stud 62 is similar to the diameter of the inner bore 60 of the stud ball 48. At the first stud end 64, the stud 62 includes a stud bore 72 which extends axially into the stud 62. As shown in FIG. 1, after the cylindrical portion 68 of the stud 62 has been inserted through the inner bore 60 of the stud ball 48, a plug 71 is inserted into the stud bore 72 and pressed therein to deform the first stud end 64 and lock the cylindrical portion 68 within the inner bore 60 of the stud 62. This establishes a durable connection between the stud 62 and the stud ball 48.

The socket assembly 20 further includes a cover plate 74 which is disposed at and closes the second end of the housing 22. In the exemplary embodiment, the second housing end 26 is bent inwardly to capture the cover plate 74. However, the cover plate 74 may be engaged with the housing 22 through any suitable means. The cover plate 74 has a lubricant opening for conveying a lubricant into the open interior of the housing 22 to lubricate the bearing 34.

Figure 10:
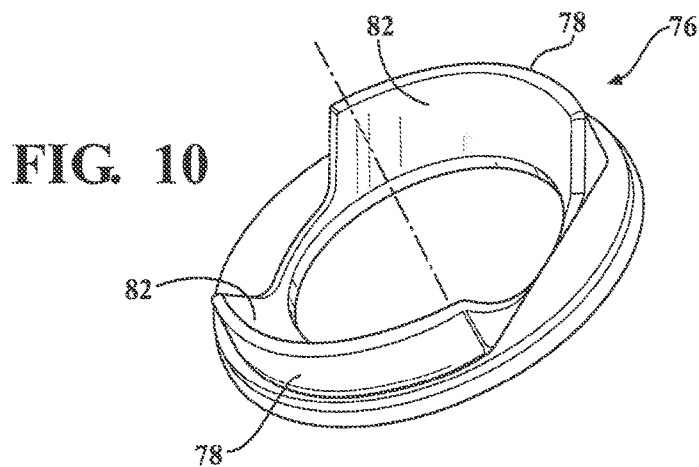
FIG. 10 is a perspective view of a shoe of the ball socket assembly of FIG. 1.

A shoe 76 is disposed in the open interior of the housing 22 and is positioned axially between the bearing 34 and the cover plate 74. As shown in FIG. 10, the exemplary shoe 76 has a pair of extensions 78 which are diametrically spaced from one another and extend generally transversely from an annular base portion. Each of the extensions 78 has a semi-spherically curved supplemental contact surface 82. As shown in FIG. 1, after assembly, the supplemental contact surfaces 82 are in sliding contact with the stud ball 48 to allow for pivoting rotation of the stud 62 and stud ball 48 relative to the bearing 34. As shown in FIG. 3, the extensions 78 are shaped and configured to extend axially into the slots 56 of the bearing 34 such that the supplemental contact surfaces 82 support the stud ball 48 in the areas of the slots 56. As such, one hemisphere of the stud ball 48 is in sliding contact around 360 degrees with only the primary contact surface 40 of the bearing 34 and the other hemisphere of the stud ball 48 is in sliding contact around substantially 360 degrees by the combination of the primary contact surface 40 of the bearing 34 and the supplemental contact surfaces 82 of the shoe 76.

A washer spring 84 is sandwiched between the shoe 76 and the cover plate 74 and biases the supplemental contact surfaces 82 of the shoe 76 against the outer surface 54 of the stud 62 for compensating for wear in the bearing 34 and in the stud ball 48 by preventing slop from developing between these components as they wear. Additionally, the washer spring 84 is configured to provide the stud ball 48 and the stud 62 with a predetermined and desirable preload which provides the socket assembly 20 with desirable rotation torque characteristics following initial assembly.

A dust boot 86 is further provided and is sealed with the housing 22 and the stud 62 to retain a lubricant, such as grease, inside the socket assembly 20 and to protect the interior components of the socket assembly 20 from external debris. The dust boot 86 may be secured to the housing 22 and to the stud 62 through any suitable means.

Another aspect of the present invention provides for a method of making a socket assembly 20. The method includes the step of preparing a housing 22 with an open interior. The method proceeds with the step of inserting a bearing 34 into the open interior of the housing 22. The bearing 34 has a primary contact surface 40 which is curved and which surrounds a stud ball opening 42 and which presents a passage 56 with a predetermined shape. The passage 56 could be generally oval in shape and defined by a pair of diametrically opposed slots 56 which extend from a face of the bearing 34 to the stud ball opening 42.

The method continues with the steps of orienting a stud ball 48 with a curved outer surface 54 into a predetermined orientation and guiding the stud ball 48 through the passage 56 and into the stud ball opening 42 of the bearing 34. The method proceeds with the step of rotating the stud ball 48 relative to the bearing 34 within the stud ball opening 42 to establish a sliding contact between the curved outer surface 54 if the stud ball 48 and the primary contact surface 40 of the bearing 34.

The method continues with the step of inserting a shoe 76 into the open interior of the housing 22. The shoe 76 has at least one supplemental contact surface 82 which extends into the passage 56 of the bearing 34 to establish sliding contact between the supplemental contact surface 82 of the shoe 76 and the curved outer surface 54 of the stud ball 48. The shoe 76 may include a pair of supplemental contact surfaces 82 which extend into a pair of slots 56 of the passage 56.

The method proceeds with the step of biasing the supplemental contact surface 82 (or surfaces) of the shoe 76 against the curved outer surface 54 of the stud ball 48 to establish a preload on the stud ball 48 and for compensating for wear in the bearing 34 and the stud ball 48. A washer spring 84 may be employed to establish the biasing of the supplemental contact surfaces 82 of the shoe 76 against the curved outer surface 54 of the stud ball 48.

Obviously, many modifications and variations of the present invention are possible in light of the above teachings and may be practiced otherwise than as specifically described while within the scope of the appended claims.

What is claimed is:

1. A method of making a ball socket assembly, comprising the steps of:
   preparing a housing with an open interior;
   inserting a bearing into the open interior of the housing, the bearing having a primary contact surface which is curved and which surrounds a stud ball opening and which presents a passage with a predetermined shape, and further including diametrically opposed slots interrupting the primary contact surface;
   orienting a stud ball having a curved outer surface and diametrically opposed truncated surfaces into a predetermined orientation such that the truncated surfaces are aligned with the diametrically opposed slots of the bearing;
   guiding said truncated surfaces of the stud ball in the predetermined and aligned orientation with the diametrically opposed slots of the bearing through the passage and into the stud ball opening of the bearing;
   rotating the stud ball relative to the bearing within the stud ball opening to establish sliding contact between the curved outer surface of the stud ball with the primary contact surface of the bearing;
   inserting a shoe into said open interior of the housing, the shoe having at least one supplemental contact surface which extends into the passage of the bearing to establish sliding contact between the supplemental contact surface of the shoe and the curved outer surface of the stud ball; and
   biasing the at least one supplemental contact surface of the shoe against said curved outer surface of the stud ball for establishing a preload on the stud ball and for compensating for wear in the bearing and the stud ball.

2. The method as set forth in claim 1 wherein the at least one supplemental contact surface of the shoe is further defined as a pair of supplemental contact surfaces.

3. The method as set forth in claim 2 wherein the passage includes a pair of slots.

4. The method as set forth in claim 3 wherein the supplemental contact surfaces of the shoe extend into the slots of the passage.

5. The method as set forth in claim 2 wherein the housing is open at opposite first and second housing ends and further including the step of engaging a cover plate with the housing to close one of the housing ends.

6. The method as set forth in claim 2 wherein the stud ball has an inner bore and further including providing a stud having a cylindrical portion and extending the cylindrical portion through the inner bore.

7. The method as set forth in claim 6 wherein an end of the stud has a stud bore.

8. The method as set forth in claim 7 further including the step of pressing a plug into the stud bore to deform the cylindrical portion of the stud and establish a locking connection with the stud ball.

9. A method of making a ball socket assembly, comprising the steps of:
   preparing a housing with an open interior;
   inserting a bearing into the open interior of the housing, the bearing having a primary contact surface which is curved and which surrounds a stud ball opening and which presents a passage with a predetermined shape;
   disposing a stud ball having an inner bore and a curved outer surface through the passage and into the stud ball opening of the bearing;
   inserting a shoe into said open interior of the housing, the shoe having at least one supplemental contact surface which extends into the passage of the bearing to establish sliding contact between the supplemental contact surface of the shoe and the curved outer surface of the stud ball;
   biasing the at least one supplemental contact surface of the shoe against said curved outer surface of the stud ball for establishing a preload on the stud ball and for compensating for wear in the bearing and the stud ball;
   providing a stud having a cylindrical portion and a stud bore extending into an end of the stud;
   extending the cylindrical portion through the inner bore; and
   pressing a plug into the stud bore and deforming the cylindrical portion of the stud radially outwardly to establish a locking connection with the stud ball.

10. The method as set forth in claim 9 further including:
   providing the bearing with diametrically opposed slots interrupting the primary contact surface;
   providing the stud ball having diametrically opposed truncated surfaces;
   guiding the truncated surfaces in aligned orientation with the diametrically opposed slots of the bearing through the passage and into the stud ball opening of the bearing; and
   rotating the stud ball relative to the bearing within the stud ball opening to establish sliding contact between the curved outer surface of the stud ball with the primary contact surface of the bearing.

* * * * *